US 6,732,195 B1

(12) United States Patent
Baldwin

(10) Patent No.: US 6,732,195 B1
(45) Date of Patent: May 4, 2004

(54) APPARATUS FOR AND METHOD OF UPDATING A DEVICE DRIVER FROM A LOCAL RESOURCE

(75) Inventor: Marie Ann Baldwin, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 535 days.

(21) Appl. No.: 09/679,665

(22) Filed: Oct. 3, 2000

(51) Int. Cl.[7] .................................................. G06F 3/00
(52) U.S. Cl. .................................. 710/6; 710/8; 710/18
(58) Field of Search .............................. 710/2, 6, 8, 18

(56) References Cited

U.S. PATENT DOCUMENTS

| 5,528,248 | A | * | 6/1996 | Steiner et al. ......... 342/357.06 |
| 6,041,183 | A | * | 3/2000 | Hayafune et al. ........... 717/173 |
| 6,195,589 | B1 | * | 2/2001 | Ketcham ...................... 700/28 |
| 6,256,129 | B1 | * | 7/2001 | Kim et al. ................... 398/129 |
| 6,411,899 | B2 | * | 6/2002 | Dussell et al. .............. 701/211 |

* cited by examiner

Primary Examiner—Jeffrey Gaffin
Assistant Examiner—Eron Sorrell

(57) ABSTRACT

A handheld portable maintenance terminal includes an Infrared transceiver for establishing a wireless communications link with a peripheral device such as a printer. The portable maintenance terminal uploads diagnostic results, activity reports, device status indicators, and other data from the peripheral device over the IR links, and downloads software updates and diagnostic routine to the peripheral. The terminal includes a display providing information about the suite of peripherals installed at a particular location including a map display indicating peripheral status and proposed "minimum walk" for efficiently visiting and servicing the peripheral devices.

14 Claims, 3 Drawing Sheets

APPARATUS FOR AND METHOD OF UPDATING A DEVICE DRIVER FROM A LOCAL RESOURCE

TECHNICAL FIELD

The invention relates to computer peripheral equipment and in particular to printers configured to interface with a portable maintenance terminals for accessing maintenance information and updating printer software/firmware.

BACKGROUND

The modern office environment typically includes multiple computer workstations, each workstation or group of workstations connected to a nearby printer. It often falls to members of an Information Systems or other computer support staff to maintain, not only the workstations, but the peripheral equipment including printers. In some cases, these printers may be accessible, either directly or indirectly, via connecting workstations, so that a network administrator can update printer resident software and/or firmware and perform other maintenance checks, tests, and functions. However, not all printers are accessible via a network nor are all functions necessarily accessible. Further, printer maintenance personnel must often be physically present at a printer location to perform certain maintenance tasks, such as changing toner cartridges, cleaning the print engine, etc. so that it may be convenient to perform other maintenance locally at the printer rather than via remote access. However, even if available, local access to the printer may require gaining access to the attached computer, loading the appropriate maintenance routines, establishing communications with the printer, downloading maintenance data from the printer to the computer and uploading software/firmware updates to the printer, etc. Alternatively, maintenance personnel can transport the printers to a central maintenance facility to perform these maintenance tasks. Obviously, such an approach is costly in terms of effort and printer downtime.

Accordingly, a need exists for a system for and method of performing on site maintenance on computer peripheral and other equipment dispersed about a location without requiring use of attached terminal equipment. A further need exists for a maintenance capability and functionality in support of local maintenance of printers.

SUMMARY OF THE INVENTION

The present invention is directed to a system and method for providing for local maintenance of a computer peripheral device such as a printer or scanner without use of computer systems, communication networks or other facilities permanently connected to the printer. The invention provides a portable, handheld maintenance terminal that communicates with a printer using an infrared or other wireless data link. Both the portable maintenance terminal and all printers include appropriate wireless transceivers to establish a wireless link therebetween. The portable maintenance terminal has software and data stored in an internal memory for downloading diagnostic software and/or copying upgraded firmware, font or other data, codes and routines to a printer as appropriate. The wireless link also supports transmission of maintenance data from the printers to the portable maintenance terminal. Such maintenance data may include printer serial number, total pages printed, pages printed since last maintenance, toner level, error codes, results of routine and specialized diagnostic routines, identification of software and firmware used by the printer, etc. The portable maintenance terminal may include a graphic display showing the relative placement, identification, status, and other information about the peripheral devices and may further guide a maintenance technician to and among the devices and provide instructions for interfacing, uploading, downloading, and performing required preventative, routine and/or suggested maintenance. The portable maintenance terminal may be a conventional personal digital assistant (PDA) or other form of portable, preferably handheld, computer programmed to support these maintenance functions. The peripheral device may be a printer having an integral infrared transceiver.

According to an aspect of the invention, a printer includes an enclosure with a transceiver attached to the enclosure. The transceiver is configured and oriented to establish a wireless communication channel with a remote unit. According to one aspect of the invention, the transceiver includes infrared (IR) detector and emitter circuitry to receive and send IR signals. A print engine is also mounted in the enclosure and has a printer interface including a connector configured to terminate a printer cable connecting the printer to a remote computer. A controller (i) functions to control the print engine in response to a print signal received at the connector, and (ii) is connected to the remote unit via the wireless communication channel to download software from the remote unit and provide maintenance data to the remote unit. The connection providing the print signal e.g., from, a local computer, may be via an appropriate parallel or serial printer port. Maintenance data provided by the controller to the remote unit may include (i) printer serial number, (ii) firmware version, (iii) RAM status, (iv) toner level, (v) pages printed, (vi) error codes, or other information generated or stored by the peripheral. The transceiver may implement an Infrared Data Association (IrDA) protocol.

According to another aspect of the invention, a portable, handheld maintenance terminal obtains maintenance data from, and downloads software to, each of a plurality of peripheral devices. The terminal includes an appropriate housing or handheld enclosure with an infrared transceiver device configured to establish bidirectional wireless communications with the peripheral devices. A display provides for the presentation of information and tactile control using, for example, virtual buttons and soft keys, etc. A memory stores appropriate programming for the device together with software to be downloaded to the peripheral devices and maintenance data uploaded from the peripheral devices. The operation of the portable maintenance terminal is controlled by a programmable microprocessor mounted in the enclosure and configured to (i) download from a remote maintenance terminal, into the memory, software used by each of the plurality of peripheral devices and (ii) selectively establish a bidirectional data communications link with each of the plurality of peripheral devices. The microprocessor further uploads, from each of the plurality of peripheral devices, to the memory, maintenance data stored by the peripheral devices and downloads, to selected ones of the peripheral devices, updated software from the memory. Finally, data from memory is uploaded under microprocessor control to the remote maintenance terminal, the maintenance data being stored by the peripheral devices.

According to a feature of the invention, a routing function performed by the microprocessor determines, for each of the peripheral devices, nearby ones of the peripheral devices for which a maintenance activity is indicated and causes the display to provide an indication thereof. The routing capability may take into consideration the urgency of the maintenance to be performed, proximity of devices, time available, and other factors in determining a "minimum walk" and most efficient itinerary for performing maintenance. Thus, the processor is further configured to generate a graphical representation of locations of the peripheral devices so that the display provides a static or moving map display including the graphical representation identifying a present location of the portable maintenance terminal on the map display.

According to another aspect of the invention, a method of determining a status of a plurality of dispersed, peripheral devices and updating software stored by the peripheral devices requires that a portable, handheld maintenance terminal be positioned near one of the peripheral devices. A bidirectional wireless communications link is established between the handheld maintenance terminal and the one peripheral device, and maintenance information concerning and stored by the one peripheral device is uploaded from the one peripheral device to the handheld maintenance terminal. Conversely, software for execution by the one peripheral device is selectively downloaded from the handheld maintenance device to the one peripheral device. Upon completion of the data exchange, the maintenance terminal is moved to the next peripheral device, wireless communications established, and the processes is continued until all devices are addressed.

According to a feature of the invention, the wireless transceiver operates in the IR spectrum and is positioned into such optical alignment with an infrared transceiver of the one peripheral device to enable establishment of the wireless communications link therebetween. According to another feature, an identify of the one peripheral device (e.g., make, model, serial number, processor identity, BIOS, software versions, etc.) is transmitted to the terminal device together with and an indication of a number of operations performed by the peripheral device since a prior uploading operation had been performed. The number of operations may include a number of pages printed.

According to another feature of the invention, a determination is made of a version of software being run by the peripheral device, the version is compared with a latest version of the software available, and, in response, any appropriate software updates are downloaded to the peripheral device.

BRIEF DESCRIPTION OF THE DRAWING

For a more complete understanding of the present invention, and the advantages thereof, reference is now made to the following descriptions taken in conjunction with the accompanying drawing, in which.

DETAILED DESCRIPTION

Figure 1:
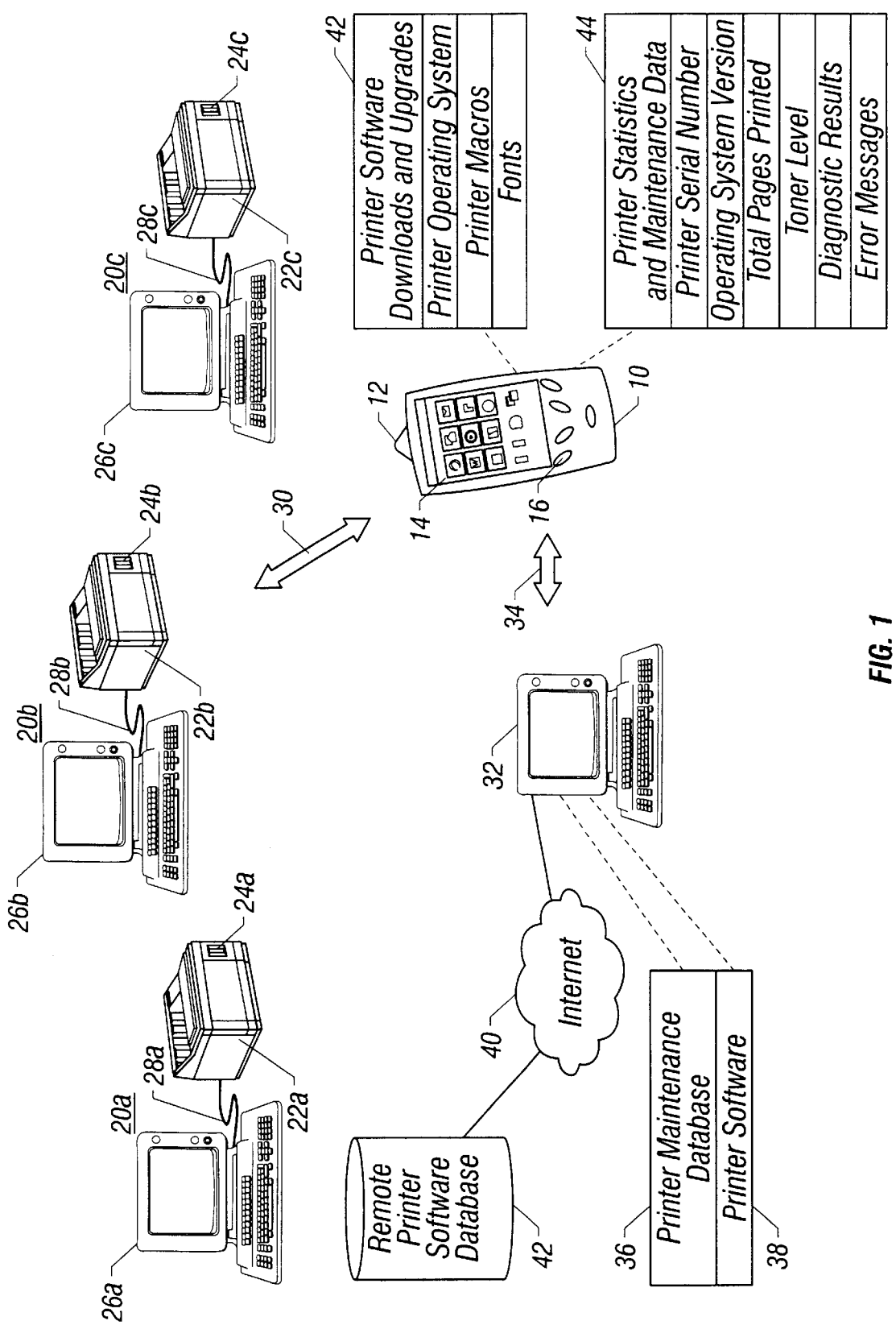
FIG. 1 is a diagram of a system and configuration of devices according to the invention for performing local maintenance of a plurality of printers using a handheld PDA type device.

FIG. 1 is a diagram showing devices and a configuration according to the invention including a handheld portable maintenance terminal 10 used to perform local maintenance on any of a number of user work stations 20a, 20b and 20c dispersed about a particular work location. Portable maintenance terminal 10 further interfaces with a maintenance work station 32 for providing access to other resources and for storing of maintenance records.

Portable maintenance terminal 10 may be a personal digital assistant (PDA) such as the Hewlett Packard HP Jornada 540 Series Color Pocket PC with appropriate software to support an IrDA link with printers 22a, 22b and 22c, and communications link with maintenance computer 32. The software supports uploading maintenance statistics, downloading software to printers, processing, aggregating and analyzing data, performing maintenance scheduling, assisting a technician to locate printers requiring maintenance using a map function, etc.

Referring to FIG. 1, portable maintenance terminal 10, includes an IR transceiver 12 for establishing wireless communications with printers 22a, 22b and 22c via respective printer transceiver ports 24a, 24b and 24c. The IR transceivers include both an IR emitter for transmitting data and an IR receptor or detector for receiving IR signals. Portable maintenance terminal 10 further includes a graphic display 14 used to control and input data to the device using, for example, a touch sensitive overlay and virtual buttons and/or keyboard. Display 14 is also used to display data received from the printers and information generated by system and application software running on portable maintenance terminal 10. In addition to the virtual buttons and keys supported by display 14, portable maintenance terminal 10 may include manually operable switches 16 having either dedicated functions or "soft-functions" defined by software.

Work stations 20a, 20b and 20c may be in the same general vicinity or dispersed about a work location such that maintenance personnel must go between work station locations to perform service and maintenance on printers 22a, 22b and 22c, respectively. Each of the printers includes a respective IR transceiver 24a–24c and is connected to a local computer 26a–26c via respective cables 28a–28c. Printers 22a–22c may be, for example, HP Laser Jet 2100 Series Printer including 4-Mbps IrDA-Complient Infrared port.

Maintenance terminal 32 communicates with portable maintenance terminal 10 via conventional means including, for example, an IrDA link 34. Maintenance terminal 32 include a printer maintenance database 36 including an inventory of, for example, printers, software, maintenance requirements, printer status, complaints, required servicing, etc. A printer software database 38 may be used to download appropriate printer software and firmware to portable maintenance terminal 10 for downloading to individual printers 22a–22c during maintenance rounds performed by maintenance personnel. Maintenance terminal 32 further includes a connection to a remote printer/software database 42 via internet connection 40. Access to such remote software databases allows maintenance personnel to download the most current version of software and firmware for use by the printers during upgrading.

Figure 2:
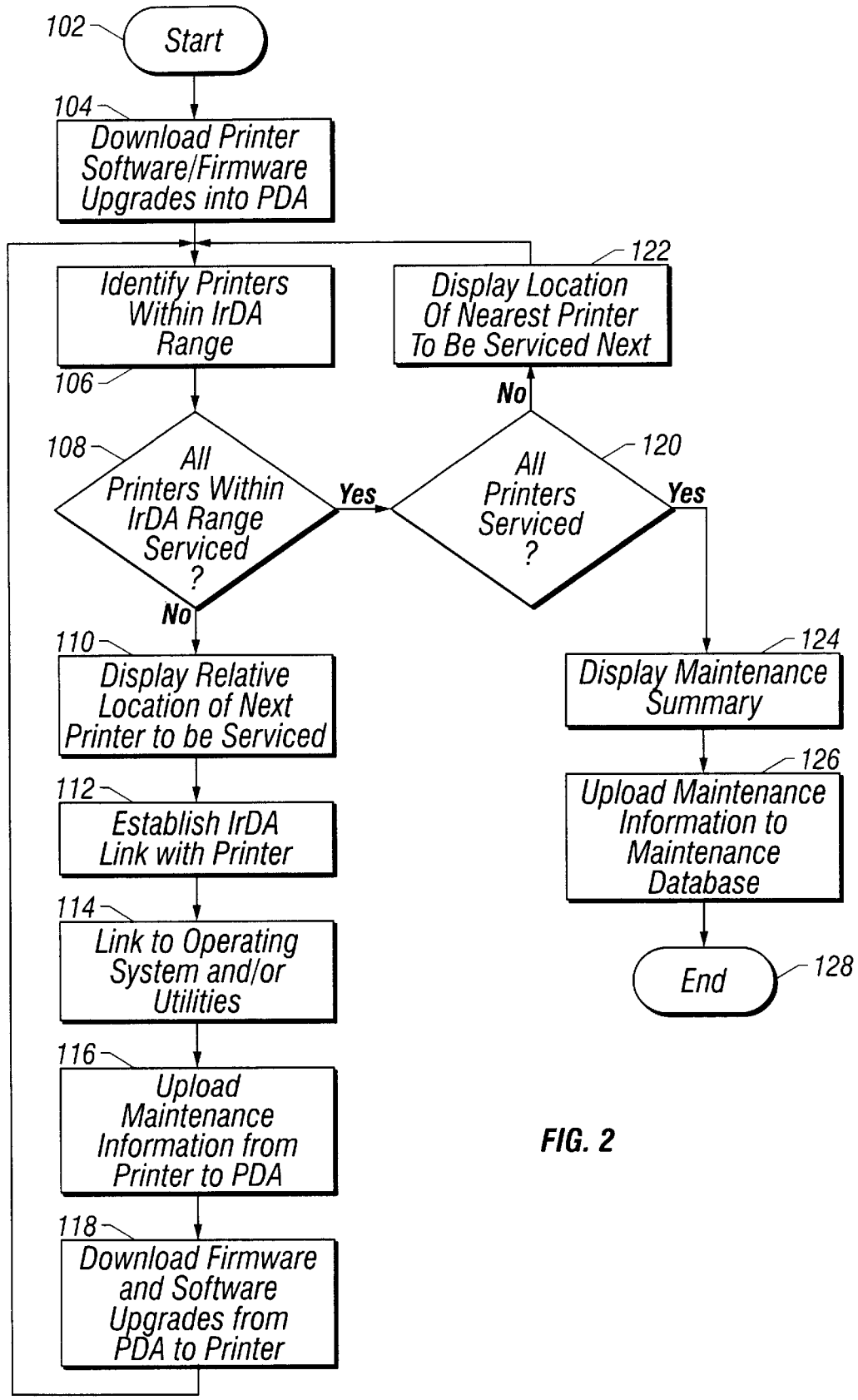
FIG. 2 is a logic flow diagram of a method according to the invention for performing local maintenance of computer peripheral devices using a handheld, portable maintenance terminal according to the invention.

Referring to FIG. 2, a logic flow diagram begins at step 102 and, at step 104, printer software and/or firmware upgrades are downloaded into a PDA used as a platform for the portable maintenance terminal. The PDA identifies printers within IR range at step 106 so that the operator is informed of link establishment as the PDA is positioned about a work space. This may require that the user selects a particular link to be established if several links are available or may require repositioning of the PDA to isolate the desired printer. If the PDA detects that all printers within IrDA range have been serviced, then flow continues to branch 120, to be described below. Else, if one or more printers still require servicing, then flow continues at step 110 wherein the PDA displays the relative location of the next printer to be serviced. At step 112 an IRDA link is established between the PDA and the printer and, at the software interface level, and the operating system and/or utilities are linked to establish communications between the PDA and the printer. At step 116 maintenance information from the printer is uploaded to the PDA. This information may include, for example, results of printer performed diagnostic routines, printer status, software and/or firmware installed, total and/or incremental number of pages printed by the printer's print engine, toner level, etc. Using this information, and in combination with other information downloaded from maintenance terminal 32, appropriate firmware and/or software upgrades are downloaded to the printer from the PDA. Processing then loops back to continue at step 106 to identify other printers requiring servicing within IrDA range. If all printers within IrDa range of the present position have been serviced, then processing continues at branch 120 where a determination is made of whether all printers requiring servicing and/or maintenance at a facility have been addressed. If the user has not serviced all printers, then flow continues its 122 where the PDA displays the location of the nearest printer to be serviced. This display may include a map showing the position of the next printer requiring servicing relative to the technicians present location determined, for example, by the known location of the printer just serviced.

If all printers have been serviced, then flow continues out of branch 120 to step 124 where a maintenance summary is displayed. At step 126, maintenance information is uploaded to the maintenance database supported by maintenance terminal 32.

The handheld maintenance device may also include a routing function for suggesting an appropriate itinerary for performing printer maintenance and servicing. The routing function may include such factors as giving priority to critical printers, printer outages, and other service affecting faults. The routing function may also take into consideration proximity of devices requiring maintenance so that efficient routing is developed, minimizing technician travel time and maximizing the number of printers visited. The routing function may further be supported by a map detailing relative location of printers to be serviced, the present location of the user being determined based on the printer most recently serviced. Alternatively, other locating devices may be used, including, for example, GPS (Global Positioning System).

Figure 3:
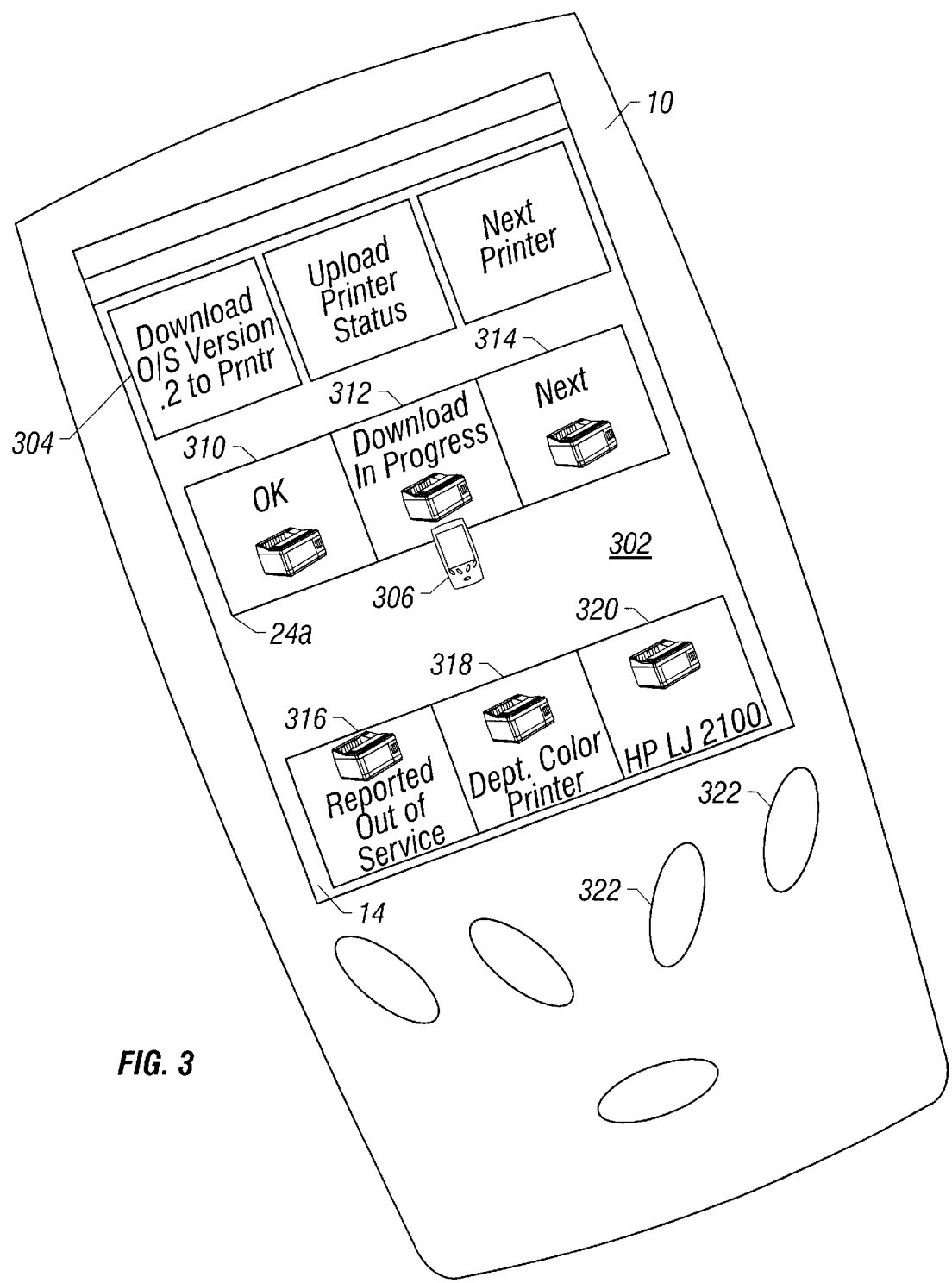
FIG. 3 is a front view of a portable maintenance terminal according to the invention.

FIG. 3 is a front view of a portable maintenance terminal implemented using a PDA such as the HP Jornada 540 Series Color Pocket PC. Referring to FIG. 3, portable maintenance terminal 10 includes a multipixel display screen 14 on which programmable virtual buttons 304 may be displayed and activated using a touch sensitive overlay or touch sensitive feature of display screen 14. A lower portion of display screen 14 is shown displaying a map 302 including a graphical depiction of the relative locations of work areas 310–320, with the current position of portable maintenance terminal 10 shown by the central icon 306. Thus, map 302 may be implemented as a moving map display, the present location of the handheld maintenance device being determined based on a known location of a most recently serviced printer or by alternative means such as GPS capabilities built into the handheld maintenance device. Also shown as part of the graphic display is the status of the various printers located at or in work areas 310–320. The status may include an indication of printers already serviced (e.g., work area 310); the progress of maintenance or service being performed (e.g., work area 312); designation of a suggested work area to be visited next (e.g. 314); device status and failure indicators (e.g., work area 316); device names or functions (e.g., work area 318); and device or printer make or model designation (e.g., work area 320). Also included as part of portable maintenance terminal 10 are manually activatable push buttons 322 having programmable functions in further support of functionality supported by the device.

Wireless connectivity between the portable maintenance terminal and printers may use a radio frequency, visible light or, preferably, infrared (IR) communication link. Suitable industry standards for short range directed Infrared data communications are promulgated by the Infrared Data Association. One implementation of a suitable IR link includes a Fast Infrared (FIR) connection. Using this or an equivalent standard and protocol, communications between portable maintenance terminal 10 and printers 22a–22c may be supported by FIR. FIR is a high-speed extension to the set of industry-standard infrared protocols published by the Infrared Data Association (IrDA). FIR is interoperable with previous IrDA standards and speed selections. FIR supports data transmission speeds of up to 4 Mb/s. Using FIR, devices negotiate transparently to their highest mode of operation that is a FIR-capable portable maintenance terminals operate correctly with SIR, MIR, and FIR capable computer peripherals, such as printers, at the maximum throughput allowed by the printer.

The combination of using infrared as the physical medium and the IrDA protocol stacks as the data and transport layers allow multiple services on dissimilar devices to operate without the need for any cables or special setup on the part of the user. The portable maintenance terminal and printer automatically establish a connection and exchange pertinent information whenever they are in range, as long as one is a primary and the other is capable of being a secondary. All IrDA-compliant devices are capable of operating to a range of 1 meter and up to a 15-degree half angle (30-degree total angle). The IrDA protocol stacks are completely self-correcting, so a connection between two IR devices will continue to exist even if the devices are temporarily taken out of range or temporarily blocked by a physical obstruction.

FIR may be implemented in both firmware and hardware on the printers such as the HP LaserJet 2100 series printers via a FIR receiver (N, TN and DN models). The printer continuously monitors the port waiting for a portable maintenance terminal to come into range, and will then respond to any connection requests. Once the connection is established, the portable maintenance terminal undergoes a service discovery phase to determine what type of device it's connected to, the device's capabilities, and what services it offers.

Portable maintenance terminals based on windows-based portable computers run an IR monitor and must be placed within range of a target printer's FIR receiver. The portable maintenance terminal then displays the printer as being in range and proceeds to upload printer status followed by downloading of any required diagnostic or operational software to the printer.

While the invention has been described in terms of a handheld maintenance device and dedicated printers, it is equally applicable to other types of devices requiring periodic maintenance and software updates. Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A handheld device for obtaining maintenance data from, and downloading software to, each of a plurality of peripheral devices, the handheld device comprising:
   an enclosure configured to be handheld;
   a transceiver configured to establish bidirectional wireless communications with said peripheral devices;
   a display;
   a memory; and
   a processor mounted in said enclosure and configured to:
      (i) download from a remote maintenance terminal, into said memory, software used by each of the plurality peripheral devices;
      (ii) determine, for each of the plurality of peripheral devices, proximate ones of the peripheral devices for which a maintenance activity is required and cause the display to provide an indication thereof;
      (iii) selectively establish a bidirectional data communications link with each of the plurality of peripheral devices;
      (iv) upload, from each of the plurality of peripheral devices to said memory, maintenance data stored by said peripheral devices;
      (v) download, to selected ones of said peripheral devices, updated software from said memory; and
      (vi) upload from said memory to said remote maintenance terminal said maintenance data stored by said peripheral devices.

2. The handheld device according to claim 1 wherein said processor is further configured to generate a graphical representation of locations of said peripheral devices and said display provides a map display including said graphical representation.

3. The handheld device according to claim 2 wherein said processor is further configured to identify a present location of said handheld device on said map display.

4. The handheld device according to claim 1 wherein the processor is further configured to route a user to each of the plurality of peripheral devices for which a maintenance activity is required in accordance with at least one of a peripheral device priority, a peripheral device outage, a substantially minimized travel time, or a substantially maximized number of peripheral devices to be serviced.

5. A method of determining a status of a plurality of dispersed, peripheral devices and updating software stored by said peripheral devices, comprising the steps of:
   (i) positioning a handheld maintenance device proximate one of said peripheral devices;
   (ii) establishing a bidirectional wireless communications link between said handheld maintenance device and said one peripheral device;
   (iii) uploading, from said one peripheral device to said handheld maintenance device maintenance information concerning and stored by said one peripheral device;
   (iv) selectively downloading, from said handheld maintenance device to said one peripheral device, software for execution by said one peripheral device;
   (v) repositioning said handheld maintenance device proximate another one of said peripheral devices; and
   (vi) repeating steps (ii) through (v).

6. The method of claim 5 wherein step (i) includes positioning an infrared transceiver on said handheld device into such optical alignment with an infrared transceiver of said one peripheral device to enable establishment of said wireless communications link therebetween.

7. The method of claim 5 wherein step (ii) includes establishing an infrared link between said handheld maintenance device and said one peripheral device.

8. The method of claim 5 wherein step (iii) includes transmission of an identifies of said one peripheral device and an indication of a number of operations performed by said one peripheral device since a prior uploading operation had been performed.

9. The method of claim 5 wherein step (iv) includes determining a version of software being run by said one peripheral device, comparing said version with a version of said software for execution by said one peripheral device, and, in response to said step of comparing, performing step (iv).

10. The method of claim 5 wherein step (v) includes transporting the handheld device between and among the peripheral devices.

11. The method of claim 5 further comprising a step of determining a location of said handheld device in response to step (ii).

12. The method of claim 5 further comprising a step of displaying a map including a present position of said handheld device relative to a plurality of said peripheral devices.

13. The method of claim 5 further comprising a step of indicating a location of a next one of said peripheral devices to be serviced.

14. The method of claim 5 further comprising a step of providing an indication of ones of said peripheral devices reporting an error condition.

* * * * *

UNITED STATES PATENT AND TRADEMARK OFFICE
CERTIFICATE OF CORRECTION

PATENT NO. : 6,732,195 B1
DATED : May 4, 2004
INVENTOR(S) : Marie Ann Baldwin

It is certified that error appears in the above-identified patent and that said Letters Patent is hereby corrected as shown below:

Column 3,
Line 33, delete "identify" and insert therefor -- identity --
Line 36, after "with" delete "and"

Column 8,
Line 34, delete "identifies" and insert therefor -- identifier --

Signed and Sealed this

Fifteenth Day of March, 2005

JON W. DUDAS
*Director of the United States Patent and Trademark Office*